July 1, 1952     E. NINEBERG     2,601,804
STEP AND REPEAT FILM HOLDER

Filed June 7, 1950     6 Sheets-Sheet 1

INVENTOR.
Edward Nineberg
BY Louis Robertson
Atty.

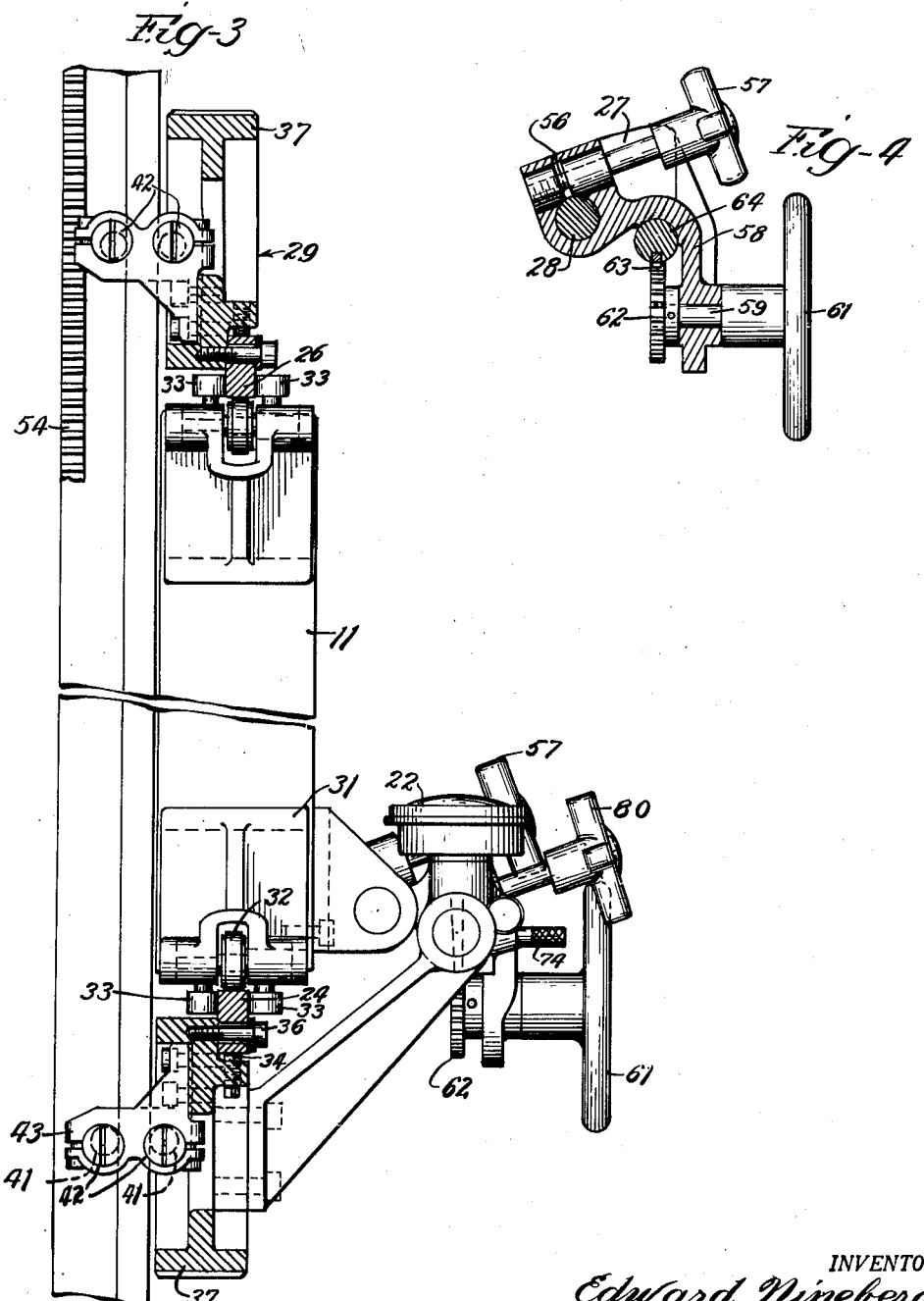

July 1, 1952  E. NINEBERG  2,601,804
STEP AND REPEAT FILM HOLDER
Filed June 7, 1950  6 Sheets-Sheet 3
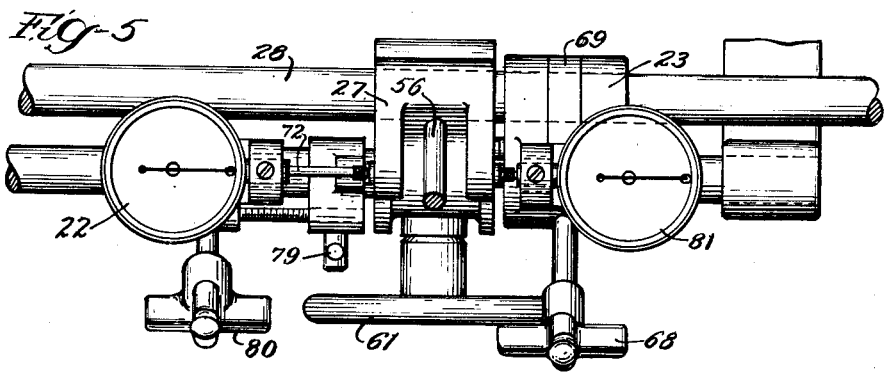
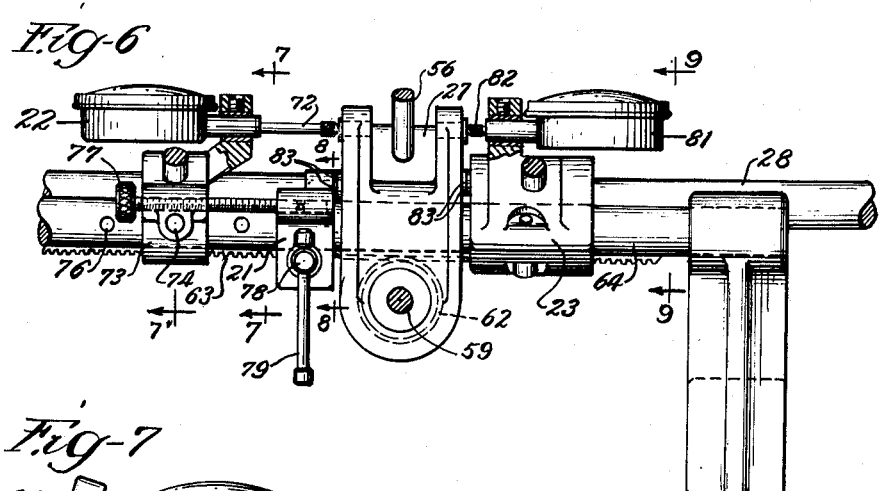
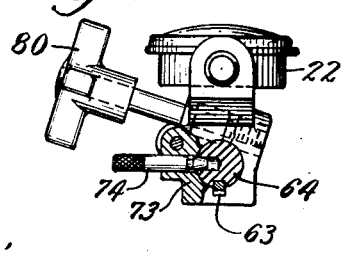
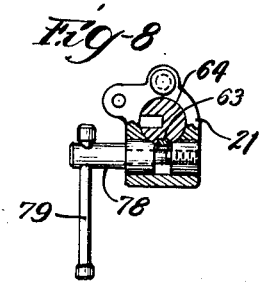
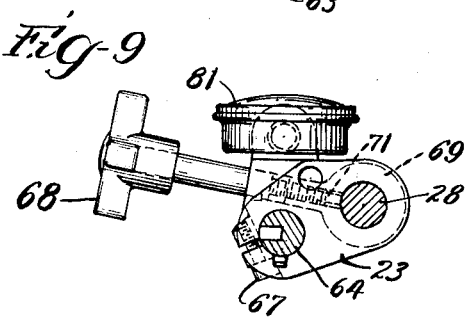
INVENTOR.
Edward Nineberg,
BY Louis Robertson
Atty.

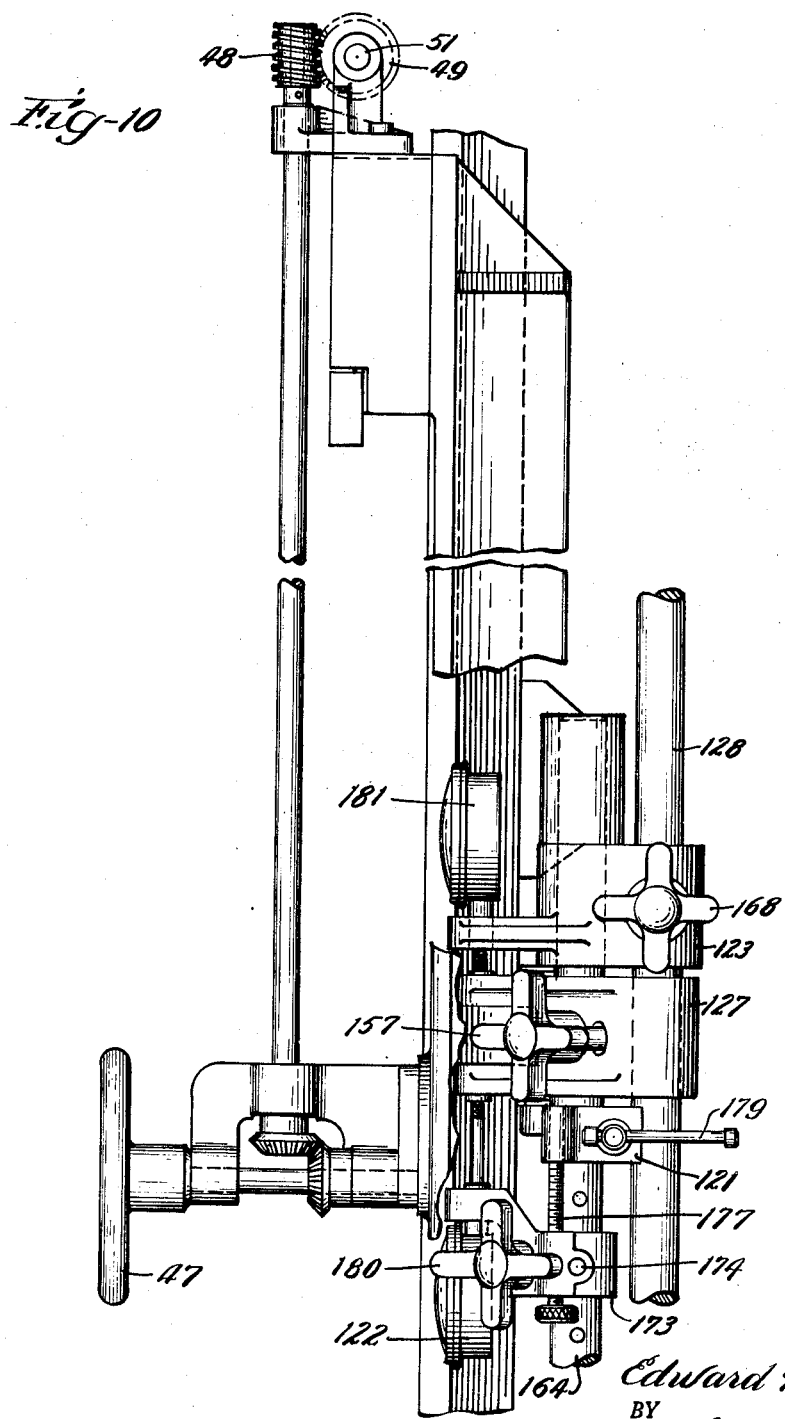

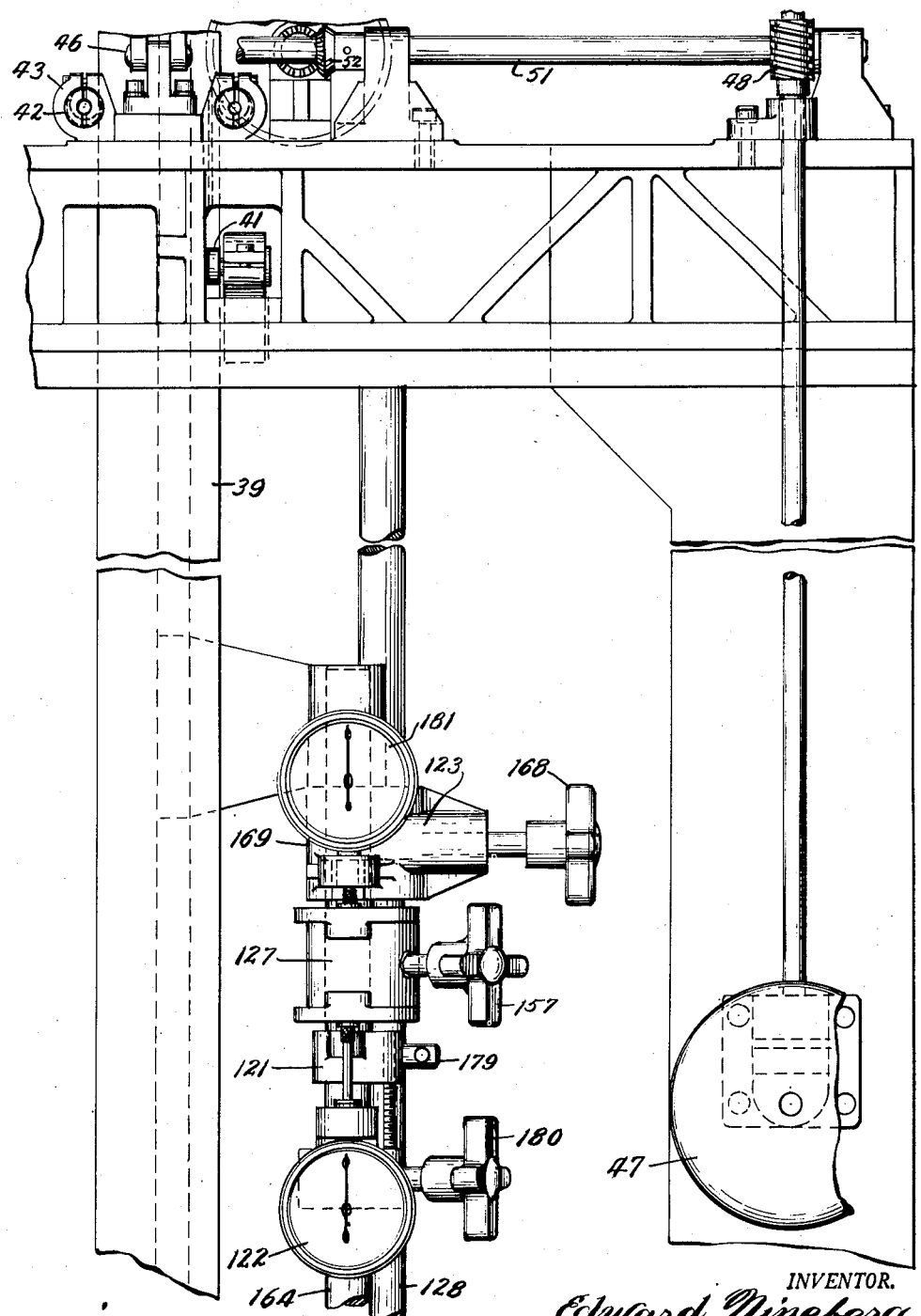

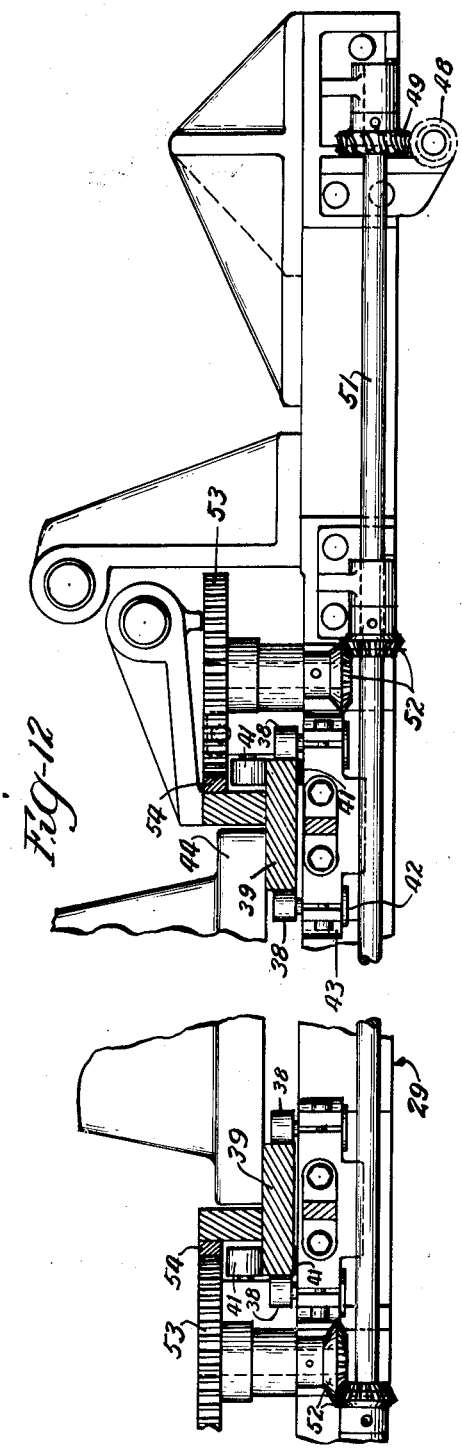

Patented July 1, 1952

2,601,804

UNITED STATES PATENT OFFICE 2,601,804

STEP AND REPEAT FILM HOLDER

Edward Nineberg, Chicago, Ill., assignor to Benjamin Sugarman, Chicago, Ill.

Application June 7, 1950, Serial No. 166,727

13 Claims. (Cl. 88—24)

This invention relates to photo-process cameras such as are used in the photographic step in making half tones and other plates for the various ordinary printing processes using ink. In the use of such cameras, there are occasions when it is desirable to make a number of different exposures, each accurately spaced, on one film. For example, in making the plate for printing a sheet of stamps, identical labels or the like, the drawings for a single such stamp or label may be used, a photograph being taken thereof on each section of the film until there are ultimately the same number of photographs on the film as will appear in the final sheet, and with the same spacing. Sometimes the finished product is to appear in more than one color, in which case a separate film is used for each color and the successive photographs must be placed thereon with such accuracy that there will be perfect registration throughout in positioning the different colors as they are printed.

According to the present invention, a step and repeat mounting for a camera back is provided by which the film carrier may be moved successively by predetermined amounts to place the desired successive portions of the film at the aperture through which the drawing being photographed may be viewed. This is accomplished by mounting the film holder so that it may move vertically and horizontally with such accurate guidance that it does not move the film from the focal plane or tilt it in any direction, and providing accurate means for making the successive desired movements. The latter may be said to be the heart of the invention. It comprises a fixed stop and an adjustable stop, the latter being arranged to be accurately set by a micro-reading gauge and a cooperative positioning bracket which, while in engagement with the fixed stop can be locked to the film carrier and moved with it into engagement with the adjusted stop. This reliably gives the film holder a movement represented by the distance between the stops and can be repeated over and over to give the desired number of positionings of the film in one direction. A like arrangement is provided for the perpendicular direction to give the desired number of movements in that direction.

Additional objects and advantages of the invention will be apparent from the following description and the drawings.

*Designation of figures*

Figure 1 is a fragmentary view of the film end of the camera and is a general front view of the embodiment of the invention chosen for illustration, Figure 2 is a fragmentary view illustrating the spacing of separately exposed photographs on a film, Figure 3 is a fragmentary vertical sectional view taken approximately on the line 3—3 of Figure 1, Figure 4 is a detail vertical sectional view taken approximately on the line 4—4 of Figure 1, Figure 5 is a fragmentary detail view looking down on the parts shown under the line 5—5 of Figure 1, these parts being moved together, Figure 6 is a view showing the parts seen in Figure 5 as they would be seen from the rear of the camera, with some parts shown in section, Figure 7 is a vertical sectional view taken approximately on the line 7—7 of Figure 6 with a portion broken away to the position 7', Figure 8 is a similar view taken approximately on the line 8—8 of Figure 6, Figure 9 is a similar view taken approximately on the line 9—9 of Figure 6, Figure 10 is a fragmentary detail view showing the parts as seen from the right of the camera in Figure 1, the framework being broken away to show vital parts as seen from the line 10—10 of Figure 1, but with the parts moved together.

Figure 11 is a view of the parts seen in Figure 10 as seen from the rear of the camera, and Figure 12 is a fragmentary horizontal sectional view taken approximately on the line 12—12 of Figure 1.

*General description*

The purpose of the invention is to facilitate the accurate positioning of a film-carrying frame 11 through a series of positions. The frame 11 may carry vertically adjustable holding bars 12 for holding a glass plate having a light sensitive film thereon, or a vacuum back 10 for holding flexible film. The term "film" is used herein to include both types of film or any other photo-sensitive member. The purpose of positioning the frame 11 through a series of positions is to expose successively portions of the film to light reaching it through an aperture 13 in a mask 14. For example, in making a printing plate for the large scale printing of a given label, a drawing showing that label will be mounted in the camera's copy holder and will be repeatedly photographed on successive portions 15 of a film 16 as indicated in Figure 2 to provide on the film a large number of identical photographs of the original drawing. A plate made from this film will be used to print large sheets of paper, and a stack of such sheets may be sliced along the lines between the rows of labels to produce the separate labels. Thus in Fig. 2, each of these separate photographs 17 corresponds to a label which will ultimately be cut from a sheet after printing.

Accurate spacing of the photographs 17 on the film 16 is necessary so that the rows of labels may be sliced apart without trimming or crowding the printed matter of the individual labels and so that the resulting labels will be of the desired size. In some instances, even greater accuracy is required. For example, when a label is to be printed in more than one color, the successive impressions must register with one another perfectly. This means that the successive films must have the series of separate photographs thereon positioned with accuracy or simultaneous registration of all of the labels would be impossible.

Although the law requires a full and exact description of at least one form of the invention, such as that which follows, it is, of course, the purpose of a patent to cover each new inventive concept therein, no matter how it may later be disguised by variations in form or additions of further improvements; and the appended claims are intended to accomplish this purpose by particularly pointing out the parts, improvements or combinations in which the inventive concepts are found.

General operation

The general method of operation can perhaps be made more clear by assuming first that the frame 11 has been positioned at the right height and it is desired to make a series of exposures to form a horizontal row of photographs across the film. To this end an adjustable stop block 21 is accurately positioned, with the help of a micro-reading gauge 22, at the proper distance from a fixed stop block 23 to provide the desired length of movement in the successive movements. The manner of making this adjustment is described below. The frame 11 is then run to the right along lower track 24 and upper track 26 to the desired position for the first exposure. After this exposure is made, gauge block 27 is moved against fixed stop block 23 and locked to a rod 28 rigidly mounted on frame 11. Frame 11 is then moved to the left until gauge block 27 strikes stop block 21. Thus the frame 11 and the film carried by it are accurately moved the predetermined distance represented by the setting of stop block 21. After the exposure for taking the desired photograph in this position, the gauge block 27 is released from rod 28, moved to the right to again lie against fixed stop block 23, locked to rod 28 and again moved with frame 11 until gauge block 27 again strikes stop block 21. Thus a second movement of frame 11 and the film carried by it is made which exactly equals the first movement. This operation is repeated until the desired row of photographs has been taken.

The horizontal tracks 24 and 26 are mounted on a vertical carriage 29 which can be raised and lowered by accurate steps to position the film accurately for additional horizontal rows successively above or below the first row. The manner of accomplishing the accurate vertical movements is similar to the manner already described for the horizontal movements.

Detailed Description

Figure 1:
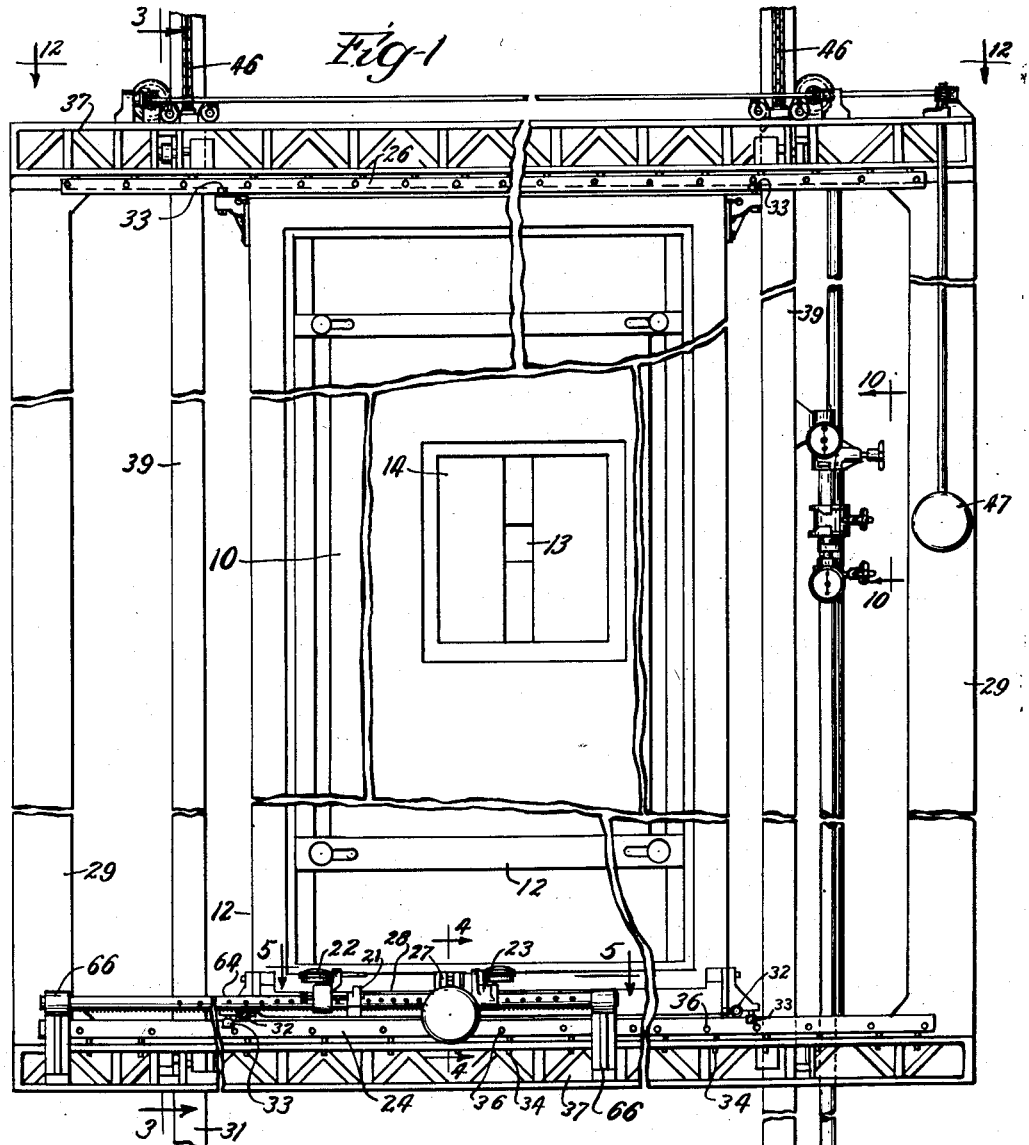
Figure 2:
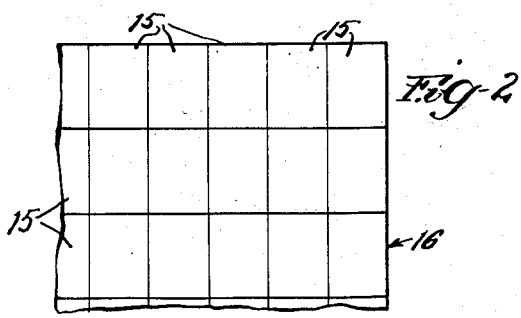

Figure 3 shows particularly the construction and mounting of the tracks by which the movements are guided. Great accuracy is necessary in order that the film will not depart from the focal plane and in order that the movements be straight line movements at exact right angles to one another. In Figure 3 the film holding frame 11 is clearly seen to be guided by horizontal tracks 24 and 26. A each corner of frame 11 is mounted a roll carrier 31. The lower carrier has rotatably mounted therein a roller 32 resting on the top of track 24 for supporting the weight of frame 11. A pair of rollers 33 extend downwardly from roll carrier 31 to engage the sides of track 24. Similar rolls 33 engage the sides of upper track 26. The track 24 may be adjusted in the factory for exact horizontal movement (or movement at exactly 90° from the vertical movement) by jack screws 34 and is clamped permanently in place by screws 36. The upper rail 26 may be similarly positioned, although there is no need for quite the same degree of accuracy, inasmuch as the bottom surface of this rail does not need to be used.

The rails 24 and 26 are carried by crossbeams 37 which form part of vertical carriage 29. The guidance of this carriage is seen best in Figure 12. Pairs of rollers 38 engage the edges of vertical tracks 39 and, near each corner of vertical carriage 29, pairs of rollers 41 engage front and rear faces of the same tracks.

Preferably all of the rollers are adjustable by means of eccentric bushings 42 so as to engage the rails with just the desired snugness. The bushings 42 may be locked in place once adjusted by tightening split holders 43.

The vertical tracks 39 may be secured to the main camera frame 44 (Fig. 12), the face of which may be machined to present a flat bearing surface for the track 39.

The movable structure may be counterweighted as indicated by counterweight chains 46 (Fig. 1) which are attached to upper crossbeam 37 of vertical carriage 29 and extend upwardly around sprockets, not shown, and downwardly to counterweights not shown. The vertical frame is moved upwardly or downwardly by turning a hand wheel 47 (Fig. 1) which, as seen in Fig. 10, indirectly drives a worm 48 which drives a worm wheel 49 on shaft 51. As seen best in Fig. 12, shaft 51, operating through bevel gears 52, drives elevating gears 53 of the spur type which run on stationary racks 54 to raise and lower the vertical carriage 29.

Step and repeat details

The details of the step and repeat gauging device are seen best in Figs. 4 to 9. As previously mentioned, the gauge block 27 may be locked to bar 28 which is rigidly carried by film carrying frame 11. The locking should be very positive, but should be capable of being applied to any point. For this reason, a clamp type of locking is preferred. Thus as seen in Fig. 4, the shaft 28 passes through a clamp portion of block 27 which may be tightened on shaft 28 by screw 56 and a suitable handle 57.

Gauge block 27 also is provided with a downwardly extending extension 58 which carries a spindle 59 which may be turned by hand wheel 61. This rotates a traversing gear 62 which moves along stationary rack 63 to move the film carrying frame 11 laterally. The rack 63 may be secured in the bottom of a stationary bar 64 carried by brackets 66 on lower beam 37 of vertical carriage 29. The word "stationary" is here used in a relative sense in recognition of the fact that during the traversing operation by hand wheel 61, the vertical carriage 29 will be stationary.

As previously mentioned, the stop blocks 23 and 21 are set to permit an exactly measured movement of gauge block 27. Fixed stop block 23 will ordinarily be set at the factory and need not be moved. As seen best in Fig. 9, its lower left end forms a split clamp which may be tightened about bar 64 by screw 67.

It may be noted at this point that whenever desired, the frame 11 may be locked against lateral movement by turning handle 68. Handle 68 is mounted on a screw which is threaded into a yoke 69 and presses a slug 71 against rod 28 to clamp the yoke 69 to rod 28. Yoke 69 has a snug fit in a vertical slot in stop block 23.

In setting adjustable stop block 21 for a given length of movement of gauge block 27, the microreading gauge 22 is used. This gauge is one similar to gauges sometimes called thickness gauges, and includes a pointer which is operated by feeler shaft or plunger 72, the gauge dial being calibrated in units representing .001 inch. Thus the position of the end of feeler shaft 72 may be read to the thousandth of an inch. The gauge 22 is carried by a clamp block 73. As seen in Fig. 7, the clamp block 73 may be positioned accurately on bar 64 by a tapered pin 74 which fits the block 73 snugly and engages accurately machined holes 76 in bar 64. In this manner the clamp block 73 may be positioned accurately at successive even inches along bar 64. The factory setting of stop block 23 on bar 64 and of microgauge 22 in clamp block 73 is such that with the clamp block thus positioned and the gauge block 27 in engagement with the stop block 23, the microreading gauge 22 will read zero. This of course is assuming that the pin 74 is in the "zero" hole 76. This hole will ordinarily be used only in making the factory adjustment. If a movement of exactly one inch is desired, the pin 74 can be set in the one-inch hole and the gauge block 27 moved from against the stop block 23 until the microreading gauge 22 indicates zero. Of course it will be rare that the desired movement happens to be exactly one or more inches. Ordinarily the gauge block 27 will be moved some given fraction of an inch more or less than an even number of inches.

The easiest way to accomplish the initial setting of the parts is to set the clamp block 73 with the pin 74 in the inch hole beyond the desired setting, then move the stop block 21 to the left of the desired setting, releasing it and drawing it left by turning a microset screw 77, then moving gauge block 27 against the stop block 21 and finally moving both stop block 21 and gauge block 27 by turning screw 77 until the microreading gauge 22 reads the desired number of thousandths of an inch, indicating the correct positioning of stop block 21 for the desired movement of gauge block 27. Stop block 21 is then clamped in place by turning screw 78 with handle 79. As seen in Fig. 8, stop block 21 is in the form of a clamp tightened about bar 64 by screw 78.

At this stage a trial movement of the film holder may be made by locking gauge block 27 to it (by screw 56) and turning hand wheel 61 to move clamp block 27 away from stop block 21 and back against stop block 21 to make sure that the microreading gauge 22 gives the desired reading with this normal operation.

The operator will now usually desire to reset the clamp block 73 so that microreading gauge 22 will have a zero reading when the gauge block 27 rests against stop block 21. This can be accomplished by withdrawing pin 74 and moving the clamp block 73 (also called a reference block) by turning microset screw 77 until the microreading gauge reads zero with gauge block 27 against stop block 21. The clamp block 73 is then locked in this position by a clamp in this clamp block operated by handle 80. In the successive traversing operations, it will now be possible for the operator to move gauge block 27 against stop block 21 and glance at gauge 22 to make sure that it reads zero. This reassures him that the movement is exact.

After the first traversing movement in which the film holding frame 11 is moved to the left in taking a series of photographs, the operator will release clamp screw 56 to free the gauge block 27 from the film holder and will move the gauge block 27 to the right against stop block 23 and again tighten screw 56 to clamp gauge block 27 to rod 28 and hence to film holding frame 11 for the next movement. Again the operator will wish to reassure himself that gauge block 27 was properly positioned against stop block 23. He may do this by glancing at another microreading gauge 81. This microgauge is identical with microreading gauge 22 except that it may have a shorter feeler shaft 82. It is set at the factory to read zero with the gauge block 27 resting against stop block 23.

As will be recognized from the drawings, stop blocks 21 and 23 and gauge block 27 are provided with raised gauge lugs 83 on anvils, the faces of which may be machined to be flat and parallel for the greatest dependability of accuracy, and may be of hardened tool steel or the like.

*Elevating details*

The details of the mechanism for gauging the successive elevating movements of vertical carriage 29 are best seen in Figs. 10 and 11. Inasmuch as they are substantially identical with the traverse gauging devices already described, they need not be described in detail. The major difference is that instead of using a single drive gear such as that carried by gauge block 27 and shown in Fig. 4, the elevating mechanism already described and operated by hand wheel 47 is preferred. For the vertical movement, this has two advantages. By using a gear and rack at each side of vertical carriage 27, smoother operation and greater accuracy are insured. By including a worm drive as seen at the top of Fig. 10, self-locking characteristics are provided. Thus there is no danger that the vertical carriage will be moved accidentally in the event of inaccurate counterbalancing or for other reasons. Such self-locking is especially desirable because if the counterbalancing weight is chosen to balance the movable structure with a plate carried by it, it will be inadequate when the heavier vacuum back is used instead of the plate.

The gauge devices in Figs. 10 and 11 have been given numbers corresponding to the traversing gauging parts already described except that each is preceded by the digit 1. Thus vertical gauge block 127 corresponds to traversing gauge block 27 although the hand wheel 61 and associated parts are omitted. The gauge block 127 is clamped to rod 128 by operation of handle 157. Gauge block 127 operates between adjustable stop block 121 and fixed stop block 123, permanently secured to rod 164. At present, stop block 123 has been shown as provided with a clamp represented by handle 168 for clamping rod 128 against movement, but this may be found unnecessary when the illustrated type of elevating drive with its self-locking worm gears is used. Clamping block 173 carrying microreading gauge 122 may be substantially identical with clamping block 73, gauge block 121 with gauge block 21, screw 177 with screw 77, and gauge 181 with gauge 81.

It will be recognized that this invention involves precision mechanism and accurate machining is important. For example, the various sliding blocks fit quite snugly to the rods on which they slide to substantially eliminate even minute canting. Perhaps microscopic canting cannot be eliminated, but it is rendered harmless by positioning each series of the gauge anvils 83 in approximate alignment. Thus the two gauge feelers and their associated gauge anvils are aligned on one line, and the other gauge anvils are approximately aligned on another line not far displaced from the first line.

From the foregoing, it is seen that a step and repeat mechanism or camera back provide highly accurate spacing of a series of exposures on one film to meet the most exacting requirements.

I claim:

1. A step and repeat camera mechanism including a film holder carriage, means for movably mounting the carriage, a gauge block, means for releasably securing the gauge block to the carriage at successive positions thereon, a fixed stop block supported to limit the movement of the gauge block in one direction, an adjustable stop block adjustably positioned to limit the movement of the gauge block in the opposite direction and microgauge means for setting the adjustable stop block, including a reference block, pin means for positioning the reference block for movements of integral units, microgauge means for indicating the spacing between the reference block and the adjustable stop block, and screw means for moving the adjustable stop block.

2. A step and repeat camera mechanism including a film holder carriage, means for movably mounting the carriage, a gauge block, means for releasably securing the gauge block to the carriage at successive positions thereon, a fixed stop block supported to limit the movement of the gauge block in one direction, an adjustable stop block adjustably positioned to limit the movement of the gauge block in the opposite direction and microgauge means for setting the adjustable stop block, including a reference block, interengaging means for positioning the reference block for movements of integral units, microgauge means for indicating the spacing between the reference block and the adjustable stop block, and microscrew means for moving the adjustable stop block.

3. A step and repeat camera mechanism including a film holder carriage, means for movably mounting the carriage, a gauge block, means for releasably securing the gauge block to the carriage at successive positions thereon, a fixed stop block supported to limit the movement of the gauge block in one direction, an adjustable stop block adjustably positioned to limit the movement of the gauge block in the opposite direction and microgauge means for determining the position of the adjustable stop block.

4. A step and repeat camera mechanism including a film holder carriage, means for movably mounting the carriage, a gauge block, means for releasably securing the gauge block to the carriage at successive positions thereon, a fixed stop block supported to limit the movement of the gauge block in one direction, an adjustable stop block adjustably positioned to limit the movement of the gauge block in the opposite direction, microgauge means for determining the position of the adjustable stop block, and micro-movement means for positioning the adjustable stop block.

5. A step and repeat camera mechanism including a film holder carriage, means for movably mounting the carriage, a gauge block, means for releasably securing the gauge block to the carriage at successive positions thereon, a fixed stop block supported to limit the movement of the gauge block in one direction, and an adjustable stop block adjustably positioned to limit the movement of the gauge block in the opposite direction.

6. A step and repeat camera mechanism including a film holder carriage, means for movably mounting the carriage including parallel tracks and rollers adjustably carried by the carriage for engaging said tracks on various sides thereof to guide the carriage accurately with respect thereto, means for movably mounting the carriage, a gauge block, means for releasably securing the gauge block to the carriage at successive positions thereon, a fixed stop block supported to limit the movement of the gauge block in one direction, and an adjustable stop block adjustably positioned to limit the movement of the gauge block in the opposite direction.

7. A step and repeat camera mechanism including a film holder carriage, means for movably mounting the carriage, a gauge block, means for releasably securing the gauge block to the carriage at successive positions thereon, a fixed stop block supported to limit the movement of the gauge block in one direction, and an adjustable stop block adjustably positioned to limit the movement of the gauge block in the opposite direction, said blocks being provided with aligned gauge anvils having accurately machined faces.

8. A step and repeat camera mechanism including a film holder carriage, means for movably mounting the carriage, a gauge block, means for releasably securing the gauge block to the carriage at successive positions thereon, a second carriage, a fixed stop block supported on the second carriage to limit the movement of the gauge block in one direction, an adjustable stop block adjustably positioned to limit the movement of the gauge block in the opposite direction, and means for mounting the second carriage for movement perpendicular to the movement of the film holder carriage.

9. A step and repeat camera mechanism including a film holder carriage, means for movably mounting the carriage, a gauge block, means for releasably securing the gauge block to the carriage at successive positions thereon, a second carriage, a fixed stop block supported on the second carriage to limit the movement of the gauge block in one direction, an adjustable stop block adjustably positioned to limit the movement of the gauge block in the opposite direction, and similar means including fixed stop, gauge block and adjustable stop block for the second carriage.

10. A step and repeat camera mechanism including a film holder carriage, means for movably mounting the carriage, a gauge block, means for releasably securing the gauge block to the carriage at successive positions thereon, a second carriage, a fixed stop block supported on the second carriage to limit the movement of the gauge block in one direction, an adjustable stop block adjustably positioned to limit the movement of the gauge block in the opposite direction, and similar means including fixed stop, gauge block and adjustable stop for the second carriage, one of said carriages being vertically movable, and means for moving it vertically including spaced parallel gear racks, rigidly associated pinions rotatably engaging the racks and means for driving the pinions.

11. A step and repeat camera mechanism including a film holder carriage, means for movably mounting the carriage, a gauge block, means for releasably securing the gauge block to the carriage at successive positions thereon, a second carriage, a fixed stop block supported on the second carriage to limit the movement of the gauge block in one direction, an adjustable stop block adjustably positioned to limit the movement of the gauge block in the opposite direction, and similar means including fixed stop, gauge block and adjustable stop for the second carriage, one of said carriages being vertically movable, and means for moving it vertically including spaced parallel gear racks, rigidly associated pinions rotatably engaging the racks and self-locking means for driving the pinions.

12. A step and repeat camera mechanism including a film holder carriage, means for movably mounting the carriage, a gauge block, slide means for slidably mounting the gauge block on the carriage, means for releasably securing the gauge block at any position along the slide means, a fixed stop block supported to limit the movement of the gauge block in one direction, an adjustable stop block, slide means for mounting the adjustable stop block, means for adjustably positioning the adjustable stop block at any point on its slide means to limit the movement of the gauge block in the opposite direction.

13. A step and repeat camera mechanism including a film holder carriage, means for movably mounting the carriage, a gauge block, slide means for slidably mounting the gauge block on the carriage, means for releasably securing the gauge block at any position along the slide means, a fixed stop block supported to limit the movement of the gauge block in one direction, an adjustable stop block, slide means for mounting the adjustable stop block, means for adjustably positioning the adjustable stop block at any point on its slide means to limit the movement of the gauge block in the opposite direction, microgauge means for setting the adjustable stop block, including a reference block, interengaging means for positioning the reference block for movements of integral units, microgauge means for indicating the spacing between the reference block and the adjustable stop block, and microscrew means for moving the adjustable stop block.

EDWARD NINEBERG.

REFERENCES CITED

The following references are of record in the file of this patent:

UNITED STATES PATENTS

| Number | Name | Date |
| --- | --- | --- |
| 1,131,631 | Pilkington | Mar. 9, 1915 |
| 1,668,562 | Huebner | May 8, 1928 |